United States Patent [19]

Koch

[11] Patent Number: 4,741,390
[45] Date of Patent: May 3, 1988

[54] METHOD AND APPARATUS FOR HEATING, VENTILATING AND EXHAUST AIR PURIFYING OF INDUSTRIAL BUILDINGS

[76] Inventor: Christian Koch, Muhlweg 13, 8570 Pegnitz, Fed. Rep. of Germany

[21] Appl. No.: 862,018

[22] Filed: May 12, 1986

[30] Foreign Application Priority Data

May 21, 1985 [DE] Fed. Rep. of Germany ....... 3518143
May 21, 1985 [DE] Fed. Rep. of Germany ... 8514955[U]
Apr. 5, 1986 [DE] Fed. Rep. of Germany ....... 3611434

[51] Int. Cl.$^4$ ............................................. F24F 3/14
[52] U.S. Cl. ........................................ 165/54; 165/60; 165/909; 165/59; 98/39.1
[58] Field of Search ............... 165/59, 60, 909, 54; 98/39.1, 33.1

[56] References Cited

U.S. PATENT DOCUMENTS

| | | | |
|---|---|---|---|
| 1,654,342 | 12/1927 | Moore | 165/59 |
| 1,936,326 | 11/1933 | Carson, Jr. | 165/59 X |
| 1,965,078 | 7/1934 | Hewitt et al. | 165/59 X |
| 2,207,714 | 7/1940 | Bulkeley | 165/59 X |
| 2,364,220 | 12/1944 | Johnson | 165/59 X |
| 2,383,811 | 8/1945 | Miller | 165/59 X |
| 3,963,461 | 6/1976 | Stockford et al. | 165/60 X |
| 4,098,854 | 7/1978 | Kuirsch et al. | 165/900 X |
| 4,494,596 | 1/1985 | Bradshaw | 165/60 X |

FOREIGN PATENT DOCUMENTS

| | | | |
|---|---|---|---|
| 0041333 | 3/1980 | Japan | 165/59 |
| 0112139 | 6/1984 | Japan | 165/60 |

Primary Examiner—Albert W. Davis, Jr.
Assistant Examiner—Richard R. Cole
Attorney, Agent, or Firm—Collard, Roe & Galgano

[57] ABSTRACT

There is provided a method and apparatus which produces a particularly high-quality fresh air atmosphere in large industrial plant buildings, the high-quality atmosphere being provided to the lower two meters of height with simultaneous heat recovery from the exhaust air and exhaust air purification. The apparatus includes a feed air tower which, as a component built in series, eliminates many of the costly ventilation ducts, reduces fuel costs to a low level, and prevents remixing with poor air from the upper layers of the air in the plant.

8 Claims, 6 Drawing Sheets

METHOD AND APPARATUS FOR HEATING, VENTILATING AND EXHAUST AIR PURIFYING OF INDUSTRIAL BUILDINGS

The present invention relates to a process and apparatus for energy-saving heating, ventilating and exhaust air purifying of industrial buildings with high air quality in the working areas and high-quality purification of the exhaust air discharged from the industrial building.

According to the present state of the art, industrial buildings or factories are currently heated directly by using a hot air, hot water or radiation heating system, vented with an exhaust air fan, possibly with a dust filter installed in the exhaust air duct, and aerated by partial recycling of the exhaust air or by admitting fresh air through open windows or doors. When recycling the exhaust air, both circulating air and fresh air are utilized, whereby the air is admitted into the industrial building or factory in the form of heated air. The drawbacks of the currently used systems are high energy expenditure for heating the industrial building, admixture of polluted air from the upper region of the industrial building, and recycling of polluted air in the circulating air circuit.

Also, efforts have been made to partially reduce energy expenditure by bringing the exhaust air in heat exchange contact with the fresh air. However, with this procedure, only a small portion of heat is withdrawn from the moist exhaust air for the dry fresh air, so that this measure is only moderately successful.

It has been discovered that irrespective of the height of the industrial building or factory, the heating and ventilating problem may be solved by supplying the lower strata of air or the lower space of 2 meters height with optimal air and temperature quality without returning the poor quality air in the upper air strata of the industrial building to the lower layer of air.

The central element for realizing the invention is a fresh air tower which sucks in both fresh air through air intake openings above the roof of the building, and circulating air through intake openings beneath the roof of the building by means of a fan. The air intake openings above and beneath the roof of the building are connected with a mechanism which can be operated in an alternating manner, i.e., the mechanism shuts off the outside air intake during the heating phase and opens the circulating air intake, on the one hand, and opens the outside air intake and closes or shuts off the circulating air intake when the exhaust air blowers operate. It has been found advantageous if the speed (number of revolutions or r.p.m.) of the ventilator is adjusted continuously or step by step relative to the performance of the exhaust air fans by centrally comparing the two systems with each other, for example with the help of static converters for the motors of the ventilators in the fresh air tower. The fresh air, which is sucked in above the roof of the building, is heated by means of heat recovery from the exhaust air, which is rich in thermal energy, and additionally wetted.

With respect to wetting or humidification, it was found that no preheating of the air prior to injection is required, so that it is thermodynamically favorable to carry out the water injection at a location upstream from the heat exchanger package, whereby the water should be atomized as finely as possible, so that the salts left over in the vaporization process may be discharged from the heat exchanger in the dry state without accumulating in the heat exchanger. Also, in connection with wetting, it was found advantageous to preconnect with respect to the wetting stage a single row of the heat exchanger battery in order to prevent freezing of the spray nozzles during the winter months.

Since the outlet openings for feeding the treated fresh air are disposed in the vicinity of personnel working areas, it was found advantageous if the four sides of the outlet openings are set separately by means of pre-throttling grids. This presetting must be readily readjustable if changes occur in the working conditions. In this way, both the direction of air outlet and the amount of air so admitted are separately adjustable on each side.

The varying amounts of fresh and exhaust air in the aeration of an industrial building have a bearing on the recovery of heat as well. It was found advantageous if the heat pump is controlled in steps depending on the temperature of the return stream or reflux of the evaporator circuit, because the reduced supply of exhaust air will also result in excessive cooling of the brine in the evaporator of the heat pump, so that if such excessive cooling occurs, the heat pump is switched step by step to a lower rate of delivery and the amount of circulating brine in the evaporator circuit is reduced.

In the stream of infeed air, the water temperatures in the heat exchangers produced by heat exchange countercurrently with the fresh air are sufficiently low as to permit the water or brine in the heat exchangers for the exhaust air to achieve not only cooling of the exhaust air but at least partial condensing of the moisture in the exhaust air as well. This condensing of the water vapor of the exhaust air leads to a coupled segregation of the particles of harmful pollutants contained in the exhaust air in the solid, liquid and gaseous state or in the form of aerosols, and thus is an excellent method of exhaust air purification. Often, the freedom from pollutants so achieved exceeds the required purity of the air significantly.

For enhancing the purification of the exhaust air and exploitation of heat recovered from the off-air, it is possible, furthermore, to add to the water circuit between the fresh air towers and exhaust air heat exchangers a cold or freezing circuit which improves the effects with respect to heat recovery and exhaust air purification especially in the presence of elevated outside temperatures.

If the amounts of exhaust air have high contents of dust, a separator or filter for separating solids may be preconnected to the cooling zone of the exhaust air.

For covering the heat requirement and in particular the transitional heat requirements during the heating phase and at particularly low outside temperatures or low equipment heat generation, the feed air in the towers may be additionally heated by additionally heating the air by way of a heat exchanger with heat from a heating circuit. It was found to be advantageous to use a heat radiation or heat wave system which supplies heat especially during the heating phase in the morning hours without excessively mixing the air vertically in the plant building. Furthermore, owing to the special features of heat transfer by radiation, this permits reducing the initial heating time. Furthermore, by heating the feed air by combined heat recovery and low-temperature heating, the exploitation of off-heat from liquid-cooled machines, waste incineration and radiation or heat wave heating may be feasible.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views.

Figure 1:
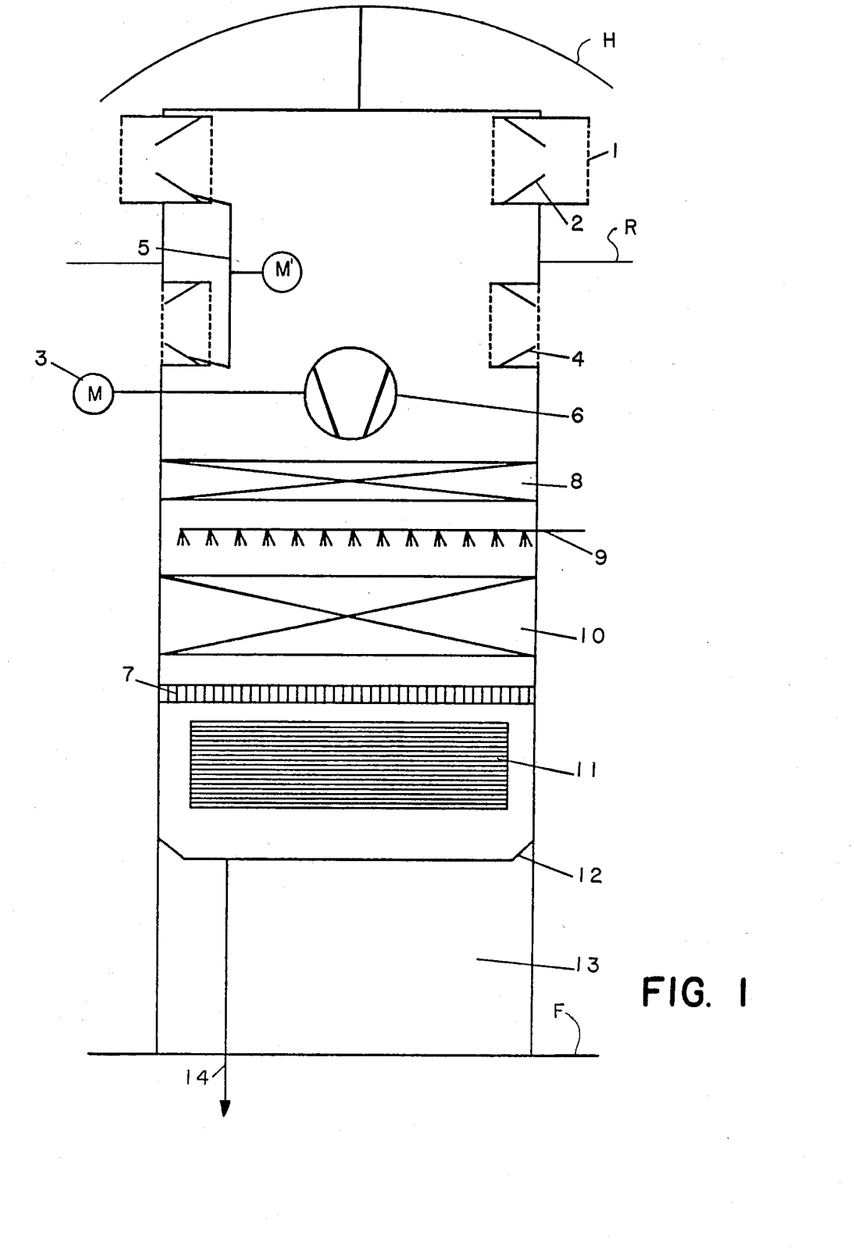
FIG. 1 is a schematic representation of the feed air tower in accordance with the present invention.

Now turning to the drawings, there is shown in FIG. 1 the structure of the feed air tower according to the present invention which is mounted on the floor F of the industrial building whose air is to be treated and which has a rain hood H mounted thereover. Reference numeral 1 designates the weather protection grids, which are mounted on two opposing sides. On the inside next to the weather protection grids, feed air flaps 2 are installed above roof R, which are connected with circulating air flaps 4 arranged therebeneath below roof R by a lever system 5 operated by motor m.

Reference numeral 6 designates a ventilator or fan driven by an infinitely controllable polyphase induction motor 3. This ventilator or fan 6 conducts the air through the tower against the lifting force caused by the heat exchangers and, by way of blow grids 11, directly into the working zone or area of the industrial or plant building. A heat exchanger element 8 is arranged between the battery of nozzles of the air wetting or humidification system 9, which may be used occasionally for cleaning the heat exchangers, and the ventilator 6, so that during the winter months, the cold feed air may be heated to such an extent that said batteries of nozzles 9 are protected against freezing. The wetted air is heated to a comfortable work place temperature in heat exchanger 10. A filter 7 is arranged downstream of heat exchanger 10 for separating also the salts collected in the form of dust in the air wetting stage.

Figure 2:
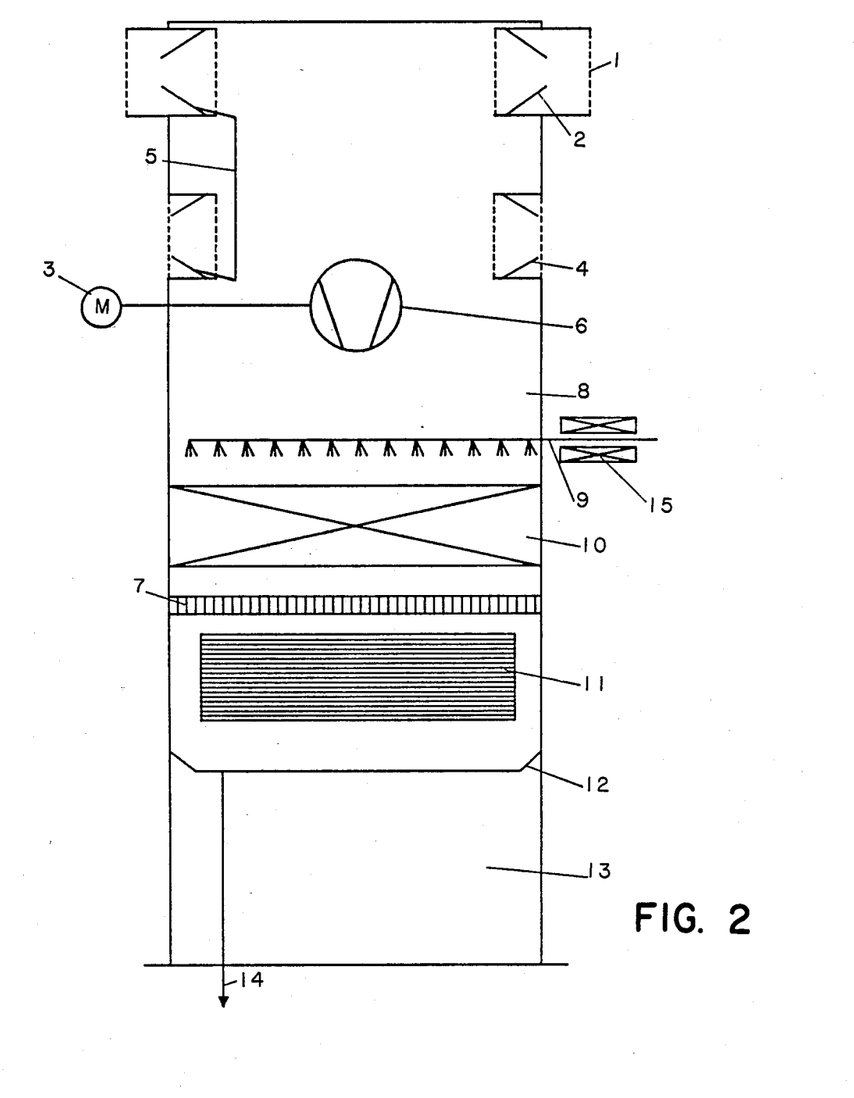
FIG. 2 is a schematic representation of a modified feed air tower similar to that shown in FIG. 1.

Also, the two heat exchangers 8 and 10 may be a single heat exchanger as is shown in FIG. 2 if the wetting station 9 is arranged, for example above the heat exchanger, and equipped with an electric heating system 15 for protecting the conduit of the wetting station against freezing.

The tower in this arrangement may be manufactured from galvanized steel sheet, or plastic material if the relatively heavy heat exchangers are arranged to be self-supporting in the lower part of the tower.

Reference numeral 11 designates the outlet grids, which are individually adjustable, permitting on all sides an individual feed of fresh, heated outside air into the working area or zone of the industrial building or plant.

Reference numeral 12 designates a drip water trough for discharging or draining excess injection water during the winter months or condensate collected under extremely hot summer weather conditions. The small condensate drain conduit 14 serves for controlled discharge of the collected moisture, which is drained, for example through the floor or foundation of the plant building and into the underlying gravel-containing layer.

An empty space 13 is disposed in the foot of the feed air tower and may be utilized for installing the electrical equipment.

The heat exchangers 8 and 10 in FIG. 1 or the heat exchanger 10 of FIG. 2 symbolize the introduction of heat from:

(1) Cooling of the exhaust air in the first stage with heat exchangers with water circulation;
(2) Cooling of the exhaust air in the second stage with heat exchanger with brine circulation, the heat exchanger being interconnected in a heat pump circuit operating as a refrigeration machine;
(3) Low-temperature heating, for example from waste incineration, off-heat exploitation with off-heat recovered from liquid-cooled machinery, and/or with heat generated by a heating or remote heating plant.

Figure 3:
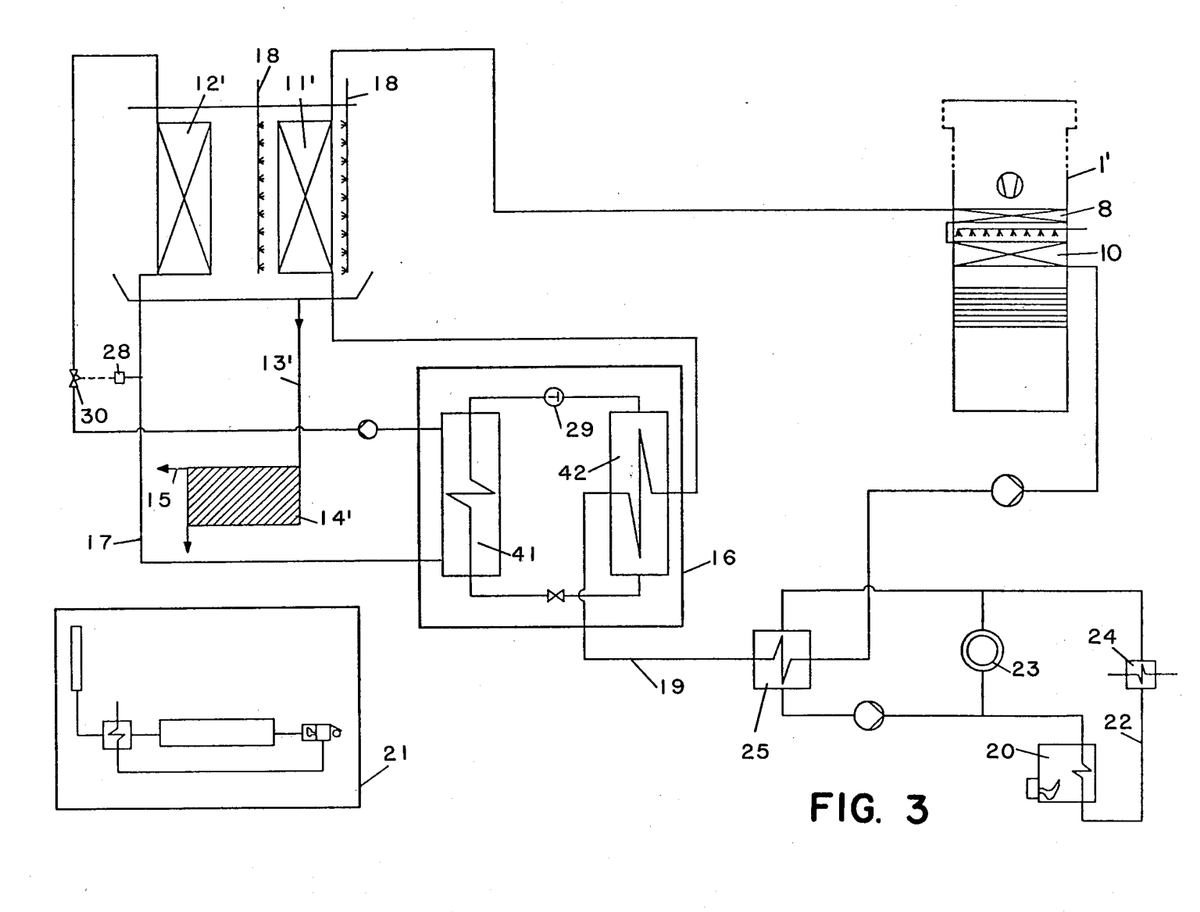
FIG. 3 is a schematic representation of the heating, ventilating and exhaust air purifying system according to the present invention.

FIG. 3 shows the cooperation between the various system components according to the present invention. In the feed air heating system, the feed air tower, designated 1', is provided with heat exchangers 8 and 10. In the heat recovery part of the exhaust air system, the water heat exchanger, designated 11', cools the exhaust air with the cooled water of the feed air tower, and thus heats the water. Another heat exchanger, designated 12', may be arranged downstream of heat exchanger 11'. Heat exchanger 12', together with evaporator 41 of heat pump 16, withdraws additional heat from the exhaust air as well as moisture. The polluted condensate in line 13' collected in said stage is purified by condensate treatment station 14' and drained into waste water conduit 15.

During the winter, heat pump 16 cools the exhaust air with the brine of evaporator 41, and during the summer period it heats the exhaust air with the water of evaporator circuit 17. In this case, heat exchanger 12' is cooled by the exhaust air that is cooled by injection of water from nozzles 18 of a wetting grid. This water vapor-containing exhaust air is subsequently heated by the warm water collected in the condenser circuit 19 to a degree low enough that the characteristic factor of delivery of the heat pump is not worse during the summer than in the winter months.

Another effect of the injected water is that it purifies the exhaust air. During the winter, purification is effected by condensing the water vapor during the cooling of the air.

Heat pump 16 is controlled by varying amounts of feed and exhaust air via the reflux temperature at 28 of evaporator circuit 17, in a way such that when the amount of exhaust air is reduced and the reflux temperature is kept constant, the flow of brine is reduced by throttling with control valve 30. In this way, the supply of heat in the evaporator 41 of the heat pump 16 is reduced, resulting in a reduced performance of compressor 29 of heat pump 16.

Figure 4:
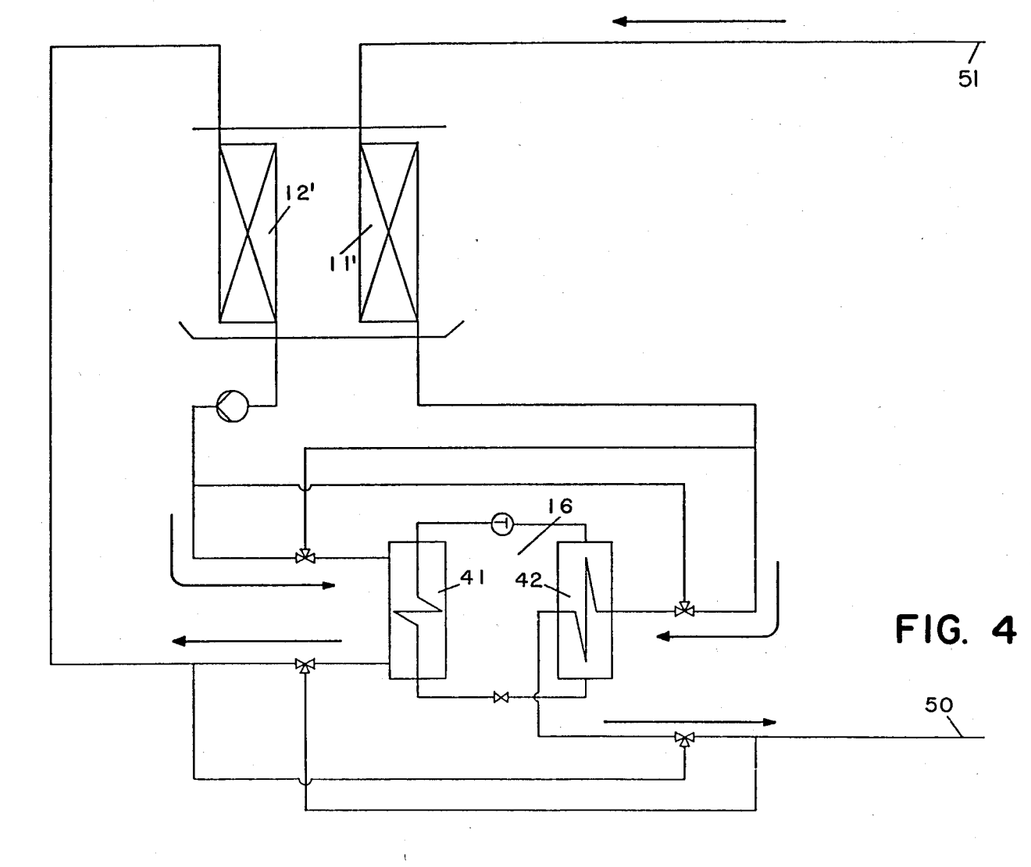
FIG. 4 is a schematic pipe layout system for use with the present invention which allows switching from summer to winter conditions.

FIG. 4 shows the pipeline system with the fittings required for switching from summer to winter conditions and vice versa. The arrow shows the direction of flow of the water or brine circuit during the winter operation. Reference numeral 50 relates to the direction of connection to the feed air towers; 51 indicates the direction of connection from the feed air towers.

Figure 5:
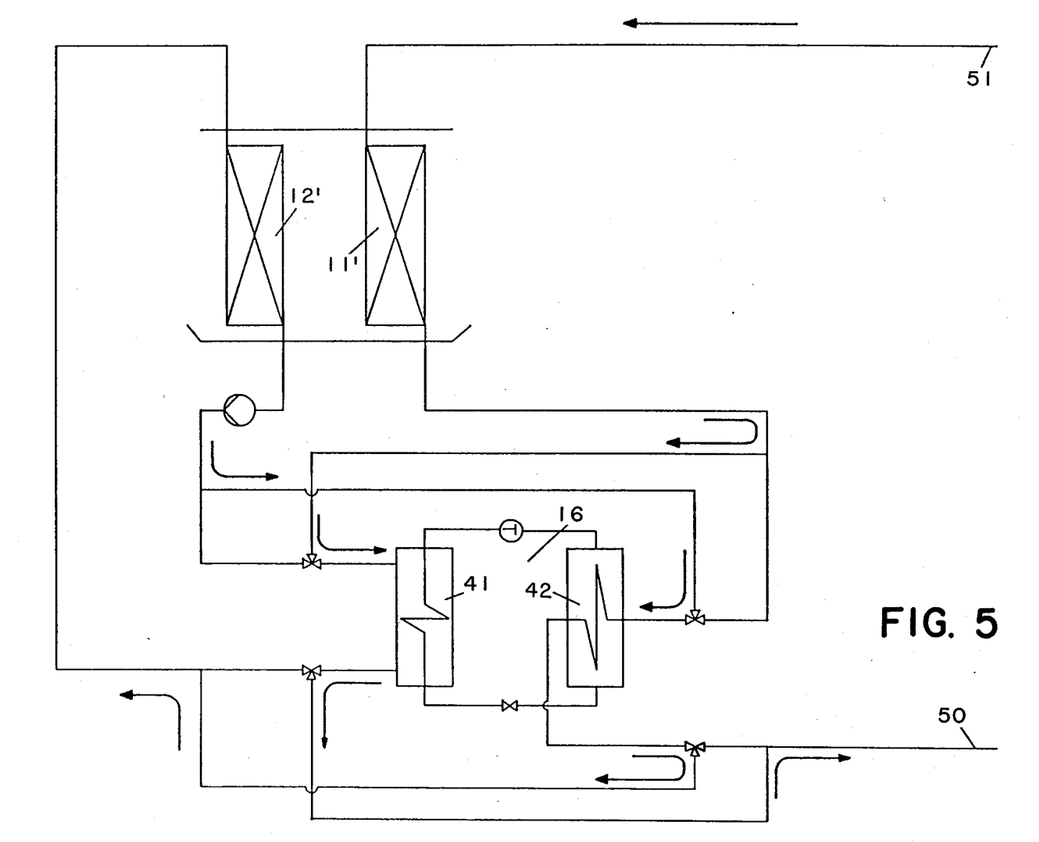
FIG. 5 is similar to FIG. 4 showing the water flow or brine circuit for summer operation.

FIG. 5 shows, based on FIG. 4, the direction of flow of the water or brine circuit during summer operation.

Figure 6:
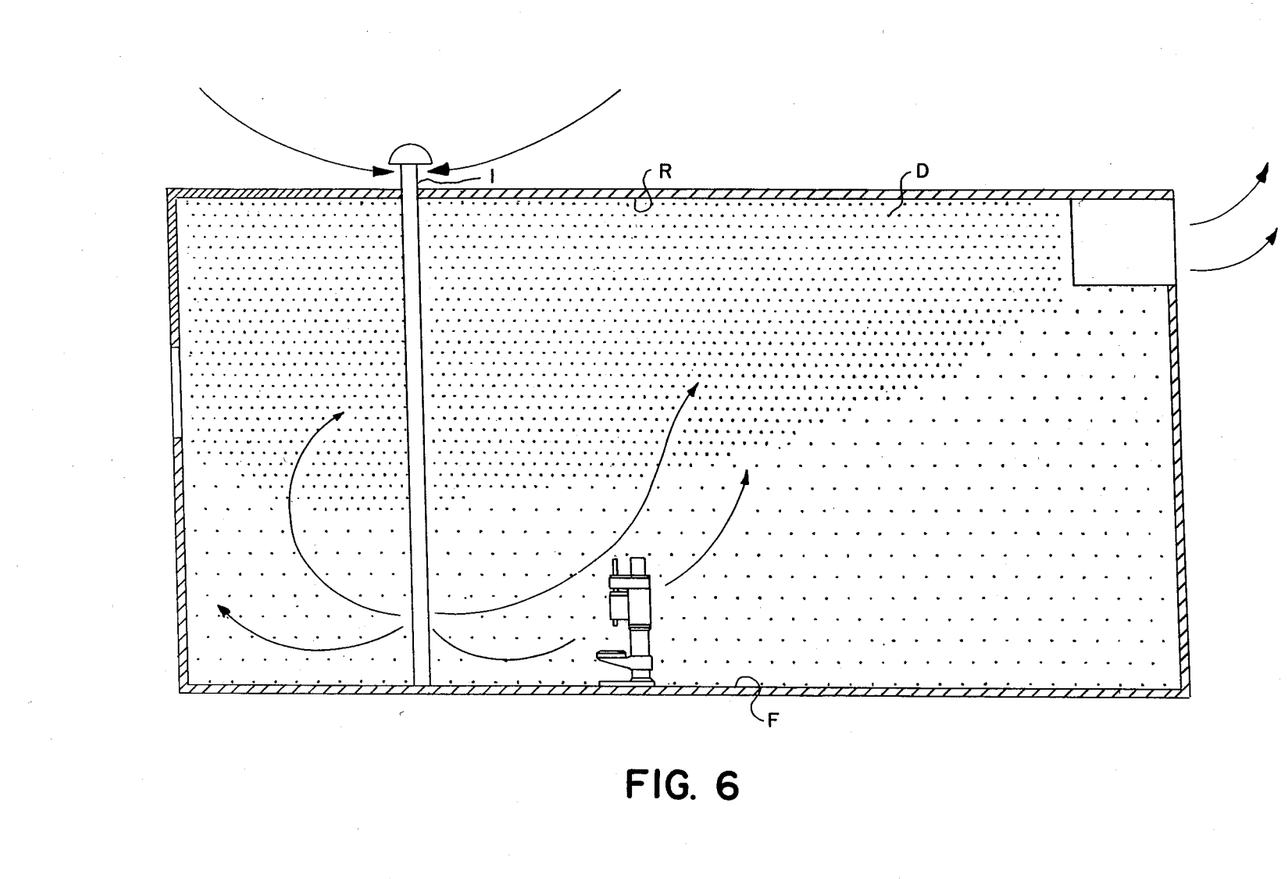
FIG. 6 is a schematic representation of a feed air tower and exhaust air heat exchanger arranged in a building.

In FIG. 6 a feed air tower 1 is shown arranged on the floor F of a building extending through the roof R. The air flow pattern is depicted in the building showing the upper level air containing a greater amount of dust D than the lower level air and the feed air entering in the lower two meters of the building and exhausting near the roof R of the building.

In the circuit according to the invention, owing to the cooling of the water in heat exchanger 11' and to the cold brine of the heat pump, a refrigerating capacity is available to the feed air towers which limits the temperature in the industrial building or plant in the summer months to about 22° C. during most hours.

Thus, circulating water in circuit 19 in FIG. 3 for heating or cooling the feed air towers passes through 1, 2 or 3 stages on the heating or cooling side both during the summer and winter months depending on the design of the arrangement.

During the winter, the circulating water is heated by the heat which is withdrawn from the exhaust air via the heat exchangers 11' and 12' with the associated heat pump, and by the after-heating effected by an after-heating heat exchanger 25, which is heated with hot water. The water is cooled countercurrently from the bottom upwardly. The temperature of the feed air is heated in this process to the wetting temperature, wetted and after-heated to feed air quality while the injected water is being evaporated.

During the summer, the circulating water is cooled in a heat exchanger (11') with the cooled exhaust air, which is saturated with moisture. Additional cooling of said circulating water is effected by a heat exchanger which is cooled with the brine of the evaporator circuit.

The circulating water so cooled serves for countercurrently cooling the stream of feed air of the feed air towers.

In the winter months, hot water for after-heating the air is produced by the low-temperature heating system 20, which may be coupled with a heat wave heating system 21. With said hot water, the heating circuit 22 may not only additionally heat the circulating water for the feed air towers, but heat also conventional heaters especially for the low-temperature heating of offices (23) as well as industrial water, the latter being heated in a heat exchanger 24.

The special features of the process of the invention are explained in greater detail with the help of a special exemplified execution of the process (winter operation):

During the winter months, a production plant of 9 meters height with a floor space of 18,000 square meters (m²) is to be maintained at a temperature of 5° C. during shutdown hours, and at 20° C. during production hours, whereby an amount of exhaust air of 160,000 cubic meters/h is required during production hours owing to the conditions of the plant operation. The feed air is admitted directly from the roof by way of feed air towers, whereby each tower is designed for an amount of feed air of 10,000 cubic meters/h.

During shutdown hours, the plant building is maintained at the required temperature by air circulation only, the operation being characterized in that the exhaust air blowers are shut off, the feed air flaps 2 are closed and the circulating air flaps 4 are open. The required transmission heat of 490 kW is covered as follows: the ventilator 6 of each tower sucks in 3800 cubic meters/h and forces this air through the heat exchangers 8 and 10. Owing to the delivery of 30.7 kW per feed air tower, the circulating air is reheated to 25° C. and admitted into the plant building by way of the blow grids 11.

When the system is operated with circulating air, the air is not wetted and the heat pump unit is shut off as well.

The amounts of feed and exhaust air may be throttled for special production conditions as required. This is achieved by both reducing the amount of air per tower by reducing the speed or r.p.m. of the feed air ventilators and by shutting off the ventilators. Temperature limiters assure uniform cooling of the water circulating in the heat exchangers of the feed air towers. The $-15°$ C. cold feed air is sucked in above the roof in the feed air towers and heated to the wetting temperature of 7° C. in the heat exchanger 8 with about 55.8 kW heat supply per feed air tower. By way of the wetting system, the air is supplied with moisture until the relative humidity of the air amounts to 95%. The moisture may be added either in the form of steam or aerosol, which has the advantage that in either case, the salts dissolved in the moisture are precipitated in the form of dust during heating in heat exchanger 10, and then separated in the filter 7.

The required evaporation heat of 60 kW/tower and the remaining heat of 60 kW/tower for after-heating of the air to the comfort temperature range is generated in heat exchanger 10.

The circulating water is cooled from 35° C. to 6° C. while passing through the feed air tower. This water enters heat exchanger 11' with this temperature (6°), and in heat exchanger 11', the water is supplied with 870 kW by the cooling of the exhaust air of the plant building.

In this heat exchange, the exhaust air is cooled to 10° C. in the first stage while the water is being heated from 6° C. to 15° C. In the second cooling stage, the exhaust air reaches a temperature of 5° C. The condensate in line 13' collected in this stage in an amount of about 540 liters/h absorbs or entraps the dust, on the one hand, said dust being contained in the air with an extremely fine distribution, and flushes said dust out; on the other hand, the condensate entraps the aerosols originating in the injection process, so that the highest possible purity of the exhaust air is achieved.

The heat of 445 kW withdrawn from the exhaust air in the second cooling stage is supplied to the circulating water by way of a heat pump circuit, and said circulating water is heated to 20° C. while passing through the condenser 42 and subsequently to 35° C. in the after-heating heat exchanger 25. The 35° C. water is pumped to the feed air towers, where it is cooled again, and the circulating water circuit is closed.

In the heat exchanger of the low-temperature heating system 20, the water is heated from about 40° C. to 61° C. A partial stream of this water is branched off for the hot water treatment station 24, which requires 30 kW. In this stage, the water is cooled to an average temperature of 60° C.

Downstream of the hot water treatment stage, another partial stream of water with a heat content of 290 kW is passed into the heating system 23 for the office wing and recreational facilities and the like. In the after-heating heat exchanger 25, 1450 kW is eliminated, whereby on the side of the low-temperature heating system, the temperature drops from 60° to 40° C., whereas on the side of the circulating water for aerating, the temperature rises from 20° to 35° C., and the heating circuit is closed.

The apparatus according to the invention is explained in greater detail with the help of the following embodiment:

The hot stream of brine is passed into the heat exchangers of the feed air towers at a level of 3 meters. The heat exchanger 10 of a feed air tower has the dimensions 1.33 m by 1.17 m and a height of 1.5 m. This heat exchanger is installed in a feed air tower made of galvanized steel sheet with the cross sectional dimensions of 1.38 m by 1.22 m. The batteries of air wetting nozzles are disposed about 0.5 m above heat exchanger 10; the air wetting nozzles at station 9 supply the stream of air with about 50 liters water/hour in the vapor or aerosol state.

Beneath heat exchanger 10, a filter mat 7 of about 5 cm thickness is arranged crosswise with respect to the flow of air, filling the total cross section. Beneath this mat at a level of about 2.5 m height, the adjustable blow grids 11 with the dimensions 1 m×0.5 m (outside dimensions) start, mounted on the side walls of the feed air tower. At a level or height of 2 meters, the cross sectional area of the tower is filled by a drip water-collecting trough 12, which, at the same time, forms the ceiling for the space 13 accommodating the electronics, said space being located in the foot of the tower. Directly above the batteries of nozzles for air wetting, a narrow heat exchanger element 8 is disposed at a height of 4.5 and 5 meters; above the latter, the ventilator is disposed at a height of 6 meters.

Two opposing circulating air flaps with the dimensions of 1 m×0.5 m are disposed beneath the ceiling of the plant building at a level of about 7 meters above the floor of the building. The circulating air flaps are connected with fresh air flaps of the same dimensions by means of a motor-driven lever system, the fresh air flaps being disposed above the roof of the building. When the exhaust air blowers start to operate, said blowers being installed in a separate filter building, the circulating air flaps close and the fresh or feed air flaps open simultaneously.

The cold water conduit of the circulating water is connected to the heat exchanger for the plant building exhaust air, said heat exchanger having the dimensions 4.4 m×4.5 m, as well as to the heat exchanger of the injection stage off-air with the dimensions 2.5 m×2.5 m. Both heat exchangers have a depth of 0.7 m. The condensation heat exchangers with the same dimensions, but with a depth of only 0.3 m, are installed directly downstream.

The condenser of the heat pump circuit with the dimensions 0.5 m×0.5 m×1.5 m and the heat exchanger for after-heating with the dimensions 1.0 m×1.0 m×2.0 m are disposed at the end of the cold water line of the circulating water system. The heat exchangers of the heat pump unit and after-heating system including all pumps are installed in a compact manner in one room. The same room accommodates the heat exchanger for the low-temperature heating system, which has the dimensions 1.5 m×1.5 m×0.5 m. The distributing station for distributing the feed and off-streams of the heating system for the office wing and recreational facilities and the like is located on the feed and return side of the low-temperature heat exchanger.

While only a single embodiment of the present invention has been shown and described, it will be obvious that many changes and modifications may be made thereunto without departing from the spirit and scope of the invention.

What is claimed is:

1. Apparatus for producing high air quality in industrial plant buildings, wherein a high degree of air exchange, recovery of heat from the exhaust air and purification of the exhaust air discharged into the atmosphere takes place, said apparatus comprises a feed air tower resting on the floor of the plant building and extending through the roof of the plant building, said tower having the following elements arranged from top to bottom therein: a rain hood, feed air and circulating air openings having closing flaps, a ventilator, a wetting system, a heat exchanger, fine-mesh filters, adjustable feed air nozzles for providing treated air to approximately the lower two meters of the plant building, a drip water-collecting trough and condensate drain conduit; and said apparatus further comprising a liquid heat recovery system connected to the heat exchanger of said feed air tower having a heat exchanger unit disposed in the stream of exhaust air, a pump for returning the liquid to the heat exchanger of said tower, a water injection system disposed in the exhaust air stream upstream from said heat exchanger therefor, a wetting grid with a drip water collecting trough arranged beneath said grid and disposed downstream of said system, and a heat pump for transfer of heat between the exhaust and the feed air.

2. The apparatus of claim 1, wherein said feed air and circulating air openings haing closing flaps comprises alternatingly closable air intake openings disposed above and beneath the roof of the plant building, said closable air intake openings being fitted with a motor-driven adjusting mechanism, said mechanism being operated by a switch-on mechanism for exhaust fans so that when the exhaust is switched on, the openings above the roof open.

3. The apparatus of claim 1, wherein said wetting system comprises a battery of nozzles for injection water disposed above the heat exchanger of a brine heating system, and said brine heating system having a small heat exchanger unit for preventing freezing of the battery of nozzles during winter.

4. The apparatus of claim 3, which further comprises a throttling valve in the brine circuit of the evaporator of said heat pump, said valve throttling the amount of brine circulation by means of a thermostat.

5. The apparatus of claim 4, which further comprises a condensate purification stage interconnected in a condensate off-stream of the exhaust air.

6. The apparatus of claim 1, wherein said feed air tower is formed of metal.

7. The apparatus of claim 1, wherein a heating phase of the plant building is effected by a heat wave heating system.

8. The apparatus of claim 1, wherein said feed air tower is formed of plastic.

* * * * *